(12) United States Patent
Kanekawa et al.

(10) Patent No.: US 11,897,449 B2
(45) Date of Patent: Feb. 13, 2024

(54) HYBRID VEHICLE CONTROL UNITS CONFIGURED FOR OPERATION CONTINUITY

(71) Applicant: Hitachi Astemo, Ltd., Hitachinaka (JP)

(72) Inventors: Nobuyasu Kanekawa, Tokyo (JP); Atsushi Arata, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 115 days.

(21) Appl. No.: 17/597,205

(22) PCT Filed: Jul. 7, 2020

(86) PCT No.: PCT/JP2020/026521
§ 371 (c)(1),
(2) Date: Dec. 29, 2021

(87) PCT Pub. No.: WO2021/006261
PCT Pub. Date: Jan. 14, 2021

(65) Prior Publication Data
US 2022/0242399 A1    Aug. 4, 2022

(30) Foreign Application Priority Data

Jul. 10, 2019   (JP) ................................ 2019-128054

(51) Int. Cl.
*B60W 20/50*    (2016.01)
*B60K 6/442*    (2007.10)
(Continued)

(52) U.S. Cl.
CPC ............. *B60W 20/50* (2013.01); *B60K 6/442* (2013.01); *B60W 50/0205* (2013.01);
(Continued)

(58) Field of Classification Search
None
See application file for complete search history.

(56) References Cited

U.S. PATENT DOCUMENTS 6,405,818 B1 *  6/2002  Anthony ............... B60W 10/06
                                                 903/910
8,249,770 B2 *  8/2012  Bennewitz ............ B60K 6/547
                                                 903/905

(Continued)

FOREIGN PATENT DOCUMENTS

JP    2004-23857 A    1/2004
JP    2011-93474 A    5/2011
(Continued)

OTHER PUBLICATIONS

International Search Report (PCT/ISA/210) issued in PCT Application No. PCT/JP2020/026521 dated Nov. 2, 2020 with English translation (four (4) pages).
(Continued)

*Primary Examiner* — Todd Melton
(74) *Attorney, Agent, or Firm* — Crowell & Moring LLP

(57) ABSTRACT

A vehicle control system includes a transmission unit, first and second sources, as well as first, second, and third control units. The first control unit controls the transmission unit. The first source inputs energy to the transmission unit. The second source inputs energy to the transmission unit. The second control unit controls the first source. The third control unit controls the second source. The first control unit has a function of continuing an operation when a failure occurs. The second control unit and the third control unit have a common cause failure measure. The function mixes energy from different sources and transmits energy to the driving wheel.

9 Claims, 13 Drawing Sheets

(51) Int. Cl.
*B60W 50/02* (2012.01)
*B60W 50/029* (2012.01)

(52) U.S. Cl.
CPC ..... *B60W 50/029* (2013.01); *B60W 2050/021* (2013.01); *B60W 2050/0292* (2013.01)

(56) References Cited

U.S. PATENT DOCUMENTS

| | | | |
|---|---|---|---|
| 10,474,603 B2 * | 11/2019 | Yoshino | ................. H04L 12/40 |
| 2017/0220035 A1 | 8/2017 | Naoi et al. | |

FOREIGN PATENT DOCUMENTS

| | | |
|---|---|---|
| JP | 2018-16107 A | 2/2018 |
| JP | 2018-69960 A | 5/2018 |
| JP | 2018-100087 A | 6/2018 |
| WO | WO 2015/129311 A1 | 9/2015 |

OTHER PUBLICATIONS

Japanese-language Written Opinion (PCT/ISA/237) issued in PCT Application No. PCT/JP2020/026521 dated Nov. 2, 2020 (four (4) pages).

\* cited by examiner

Fail-Operational

Fail-Operational

FIG. 16

| Case | DIAGNOSIS RESULT 12-1 | 12-2 | 12-3a | 12-3b | | OPERATION |
|---|---|---|---|---|---|---|
| 1 | OK | OK | OK | OK | ECU 10-1 | OPTIMALLY CONTROL MOTIVE POWER (ENERGY) SOURCE 100 BY ENERGY MANAGEMENT |
| | | | | | ECU 10-2 | OPTIMALLY CONTROL MOTIVE POWER (ENERGY) SOURCE 200 BY ENERGY MANAGEMENT |
| | | | | | ECU 10-3a | OPERATE COMBINER 300 WITH OUTPUTS OF MOTIVE POWER (ENERGY) SOURCES 100 AND 200 |
| | | | | | ECU 10-3b | OPERATE COMBINER 300 WITH OUTPUTS OF MOTIVE POWER (ENERGY) SOURCES 100 AND 200 |
| 2 | NG | OK | OK | OK | ECU 10-1 | UNCONTROLLABILITY → STOP OPERATION OF MOTIVE POWER (ENERGY) SOURCE 100 |
| | | | | | ECU 10-2 | CONTROL MOTIVE POWER (ENERGY) SOURCE 200 WITH REQUIRED TORQUE 11 |
| | | | | | ECU 10-3a | OPERATE COMBINER 300 WITH OUTPUT OF MOTIVE POWER (ENERGY) SOURCE 200 |
| | | | | | ECU 10-3b | OPERATE COMBINER 300 WITH OUTPUT OF MOTIVE POWER (ENERGY) SOURCE 200 |
| 3 | OK | NG | OK | OK | ECU 10-1 | CONTROL MOTIVE POWER (ENERGY) SOURCE 200 WITH REQUIRED TORQUE 11 |
| | | | | | ECU 10-2 | UNCONTROLLABILITY → STOP OPERATION OF MOTIVE POWER (ENERGY) SOURCE 200 |
| | | | | | ECU 10-3a | OPERATE COMBINER 300 WITH OUTPUT OF MOTIVE POWER (ENERGY) SOURCE 100 |
| | | | | | ECU 10-3b | OPERATE COMBINER 300 WITH OUTPUT OF MOTIVE POWER (ENERGY) SOURCE 100 |
| 4 | NG | NG | * | * | ECU 10-1 | UNCONTROLLABILITY → STOP OPERATION OF MOTIVE POWER (ENERGY) SOURCE 100 |
| | | | | | ECU 10-2 | UNCONTROLLABILITY → STOP OPERATION OF MOTIVE POWER (ENERGY) SOURCE 200 |
| | | | | | ECU 10-3a | STOP OPERATION OF COMBINER 300 |
| | | | | | ECU 10-3b | STOP OPERATION OF COMBINER 300 |
| 5 | OK | OK | NG | OK | ECU 10-1 | OPTIMALLY CONTROL MOTIVE POWER (ENERGY) SOURCE 100 BY ENERGY MANAGEMENT |
| | | | | | ECU 10-2 | OPTIMALLY CONTROL MOTIVE POWER (ENERGY) SOURCE 200 BY ENERGY MANAGEMENT |
| | | | | | ECU 10-3a | UNCONTROLLABILITY → ECU 10-3b OPERATES COMBINER 300 WITH OUTPUTS OF MOTIVE POWER (ENERGY) SOURCES 100 AND 200 |
| | | | | | ECU 10-3b | OPERATE COMBINER 300 WITH OUTPUTS OF MOTIVE POWER (ENERGY) SOURCES 100 AND 200 |
| 6 | NG | OK | NG | OK | ECU 10-1 | UNCONTROLLABILITY → STOP OPERATION OF MOTIVE POWER (ENERGY) SOURCE 100 |
| | | | | | ECU 10-2 | CONTROL MOTIVE POWER (ENERGY) SOURCE 200 WITH REQUIRED TORQUE 11 |
| | | | | | ECU 10-3a | UNCONTROLLABILITY → ECU 10-3b OPERATES COMBINER 300 WITH OUTPUT OF MOTIVE POWER (ENERGY) SOURCE 200 |
| | | | | | ECU 10-3b | OPERATE COMBINER 300 WITH OUTPUT OF MOTIVE POWER (ENERGY) SOURCE 200 |
| 7 | OK | NG | NG | OK | ECU 10-1 | CONTROL MOTIVE POWER (ENERGY) SOURCE 200 WITH REQUIRED TORQUE 11 |
| | | | | | ECU 10-2 | UNCONTROLLABILITY → STOP OPERATION OF MOTIVE POWER (ENERGY) SOURCE 200 |
| | | | | | ECU 10-3a | UNCONTROLLABILITY → ECU 10-3b OPERATES COMBINER 300 WITH OUTPUT OF MOTIVE POWER (ENERGY) SOURCE 100 |
| | | | | | ECU 10-3b | OPERATE COMBINER 300 WITH OUTPUT OF MOTIVE POWER (ENERGY) SOURCE 100 |
| 8 | OK | OK | OK | NG | ECU 10-1 | OPTIMALLY CONTROL MOTIVE POWER (ENERGY) SOURCE 100 BY ENERGY MANAGEMENT |
| | | | | | ECU 10-2 | OPTIMALLY CONTROL MOTIVE POWER (ENERGY) SOURCE 200 BY ENERGY MANAGEMENT |
| | | | | | ECU 10-3a | OPERATE COMBINER 300 WITH OUTPUTS OF MOTIVE POWER (ENERGY) SOURCES 100 AND 200 |
| | | | | | ECU 10-3b | UNCONTROLLABILITY → ECU 10-3a OPERATES COMBINER 300 WITH OUTPUTS OF MOTIVE POWER (ENERGY) SOURCES 100 AND 200 |
| 9 | NG | OK | OK | NG | ECU 10-1 | UNCONTROLLABILITY → STOP OPERATION OF MOTIVE POWER (ENERGY) SOURCE 100 |
| | | | | | ECU 10-2 | CONTROL MOTIVE POWER (ENERGY) SOURCE 200 WITH REQUIRED TORQUE 11 |
| | | | | | ECU 10-3a | OPERATE COMBINER 300 WITH OUTPUT OF MOTIVE POWER (ENERGY) SOURCE 200 |
| | | | | | ECU 10-3b | UNCONTROLLABILITY → ECU 10-3a OPERATES COMBINER 300 WITH OUTPUT OF MOTIVE POWER (ENERGY) SOURCE 200 |
| 10 | OK | NG | OK | NG | ECU 10-1 | CONTROL MOTIVE POWER (ENERGY) SOURCE 200 WITH REQUIRED TORQUE 11 |
| | | | | | ECU 10-2 | UNCONTROLLABILITY → STOP OPERATION OF MOTIVE POWER (ENERGY) SOURCE 200 |
| | | | | | ECU 10-3a | OPERATE COMBINER 300 WITH OUTPUT OF MOTIVE POWER (ENERGY) SOURCE 100 |
| | | | | | ECU 10-3b | UNCONTROLLABILITY → ECU 10-3a OPERATES COMBINER 300 WITH OUTPUT OF MOTIVE POWER (ENERGY) SOURCE 100 |
| 11 | * | * | NG | NG | ECU 10-1 | UNCONTROLLABILITY → STOP OPERATION OF MOTIVE POWER (ENERGY) SOURCE 100 |
| | | | | | ECU 10-2 | UNCONTROLLABILITY → STOP OPERATION OF MOTIVE POWER (ENERGY) SOURCE 200 |
| | | | | | ECU 10-3a | STOP OPERATION OF COMBINER 300 |
| | | | | | ECU 10-3b | STOP OPERATION OF COMBINER 300 |

IN NORMAL STATE

WHEN MOTOR ECU FAILS

WHEN BATTERY ECU FAILS

WHEN ENGINE-GENERATOR ECU FAILS

IN NORMAL STATE (SoC LOW)

IN NORMAL STATE (SoC HIGH)

WHEN BATTERY ECU FAILS

WHEN ENGINE-GENERATOR ECU FAILS

HYBRID VEHICLE CONTROL UNITS CONFIGURED FOR OPERATION CONTINUITY

TECHNICAL FIELD

The present invention relates to a control system, and more particularly, to a control system capable of continuing an operation when a failure occurs.

BACKGROUND ART

Fully automated control including autonomous driving does not require manual manipulation, and thus, it is possible to reduce a probability of an accident caused by a human error and to improve the safety. In advanced autonomous driving, high safety is required since a system is responsible for vehicle control. As one of requirements for the safety, there is a requirement for a fail-safe operation (failure-time operation continuation capability).

This refers to a function of maintaining minimum performance by using a remaining function, rather than immediately stopping a function when a part of components fails. In the driving control, it is possible to ensure safety as compared with a case where a vehicle immediately stops by enabling the vehicle to move to a safe place and then stop, for example, even if a failure occurs.

A driving control system that realizes autonomous driving includes not only a high-order arithmetic unit (hereinafter, referred to as an "autonomous driving control unit") that makes a driving plan but also a low-order arithmetic unit (hereinafter, referred to as a "drive system control unit") that controls a device controlling a motion of a vehicle, such as an engine, a battery, and a power converter (inverter), under the control of the high-order calculation unit. The fail-safe operation (failure-time operation continuation capability) of the drive system control unit as well as the autonomous driving control unit is required in order to enable stop after moving to a safe place even if a failure occurs.

Hybrid drive systems in which different motive power (energy) sources such as an engine and a motor are combined have been also widely used from the viewpoint of environmental protection and sustainability of social activities of human beings. In particular, it is expected that series hybrid drive systems will be widely used from now on due to linear characteristics thereof from the viewpoint of autonomous driving.

For example, a technique described in PTL 1 is disclosed regarding the fail-time operation continuation capability at an electronic device that controls these automobiles.

CITATION LIST

Patent Literature

PTL 1: JP 2018-016107 A

SUMMARY OF INVENTION

Technical Problem

According to the conventional technique described above, it is possible to enhance the reliability of the operation continuity when a failure occurs, but it is desirable to further consider cost reduction on a premise of redundancy of a control device.

Therefore, an object of the present invention is to realize a control device having operation continuity when a failure occurs with less redundancy and achieve cost reduction.

Solution to Problem

In order to achieve the above object, the present invention devises the following means.
(1) Different motive power (energy) sources provided in a hybrid drive system are regarded as redundant motive power (energy) sources.
(2) A control unit (first control unit) of a transmission unit that mixes motive power (energy) from different motive power (energy) sources and transmits energy to a driving wheel is provided with a failure-time operation continuation function.
(3) Control units (a second control unit and a third control unit) that respectively control the different motive power (energy) sources are configured to take a common cause failure measure such that both control functions are not lost due to the same failure.
(4) When one motive power (energy) source or a control unit of the motive power (energy) source fails, an energy management control unit (fourth control unit) that controls the mixing ratio of the motive power (energy) from the different motive power (energy) sources in the transmission unit controls the transmission unit to transmit the energy to the driving wheel by the motive power (energy) from the other motive power (energy) source.

Advantageous Effects of Invention

According to the means described above, the control units of the transmission unit, which mixes the motive power (energy) from the different motive power (energy) sources provided in the hybrid drive system and transmits the energy to the driving wheel, have a redundant configuration. Thus, the operation of the entire system can be continued even if any of the control units constituting the hybrid drive system fails. For example, even when one motive power (energy) source or a control unit of the motive power (energy) source fails, the operation can be continued by controlling the transmission unit to transmit the energy to the driving wheel by motive power (energy) from the other motive power (energy) source. In addition, the control of the transmission unit can be continued even if a failure occurs in the control unit of the transmission unit by providing the failure-time operation continuation function to the control unit of the transmission unit that becomes a single failure point of the entire system, so that the operation of the entire system can be continued, that is, the entire system becomes fail-operational.

Since the different motive power (energy) sources provided in the hybrid drive system are regarded as redundant motive power (energy) sources, it is possible to make the hybrid drive system fail-operational by minimizing redundancy without requiring additional redundancy, and it is possible to achieve both implementation of the failure-time operation continuity and cost reduction.

BRIEF DESCRIPTION OF DRAWINGS

FIG. 16 illustrates an operation example.

DESCRIPTION OF EMBODIMENTS

Hereinafter, an embodiment of the present invention will be described with reference to the drawings.

First Embodiment

Figure 1:
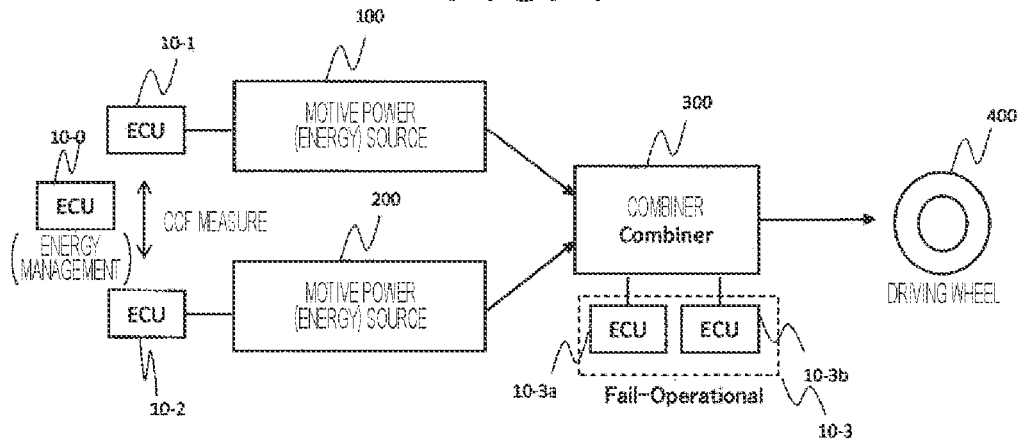
FIG. 1 illustrates a basic embodiment of the present invention.
Figure 2:
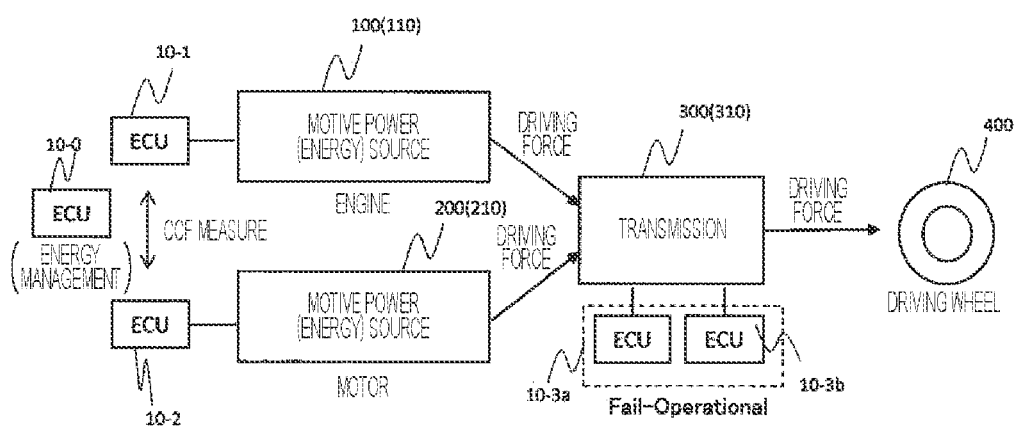
FIG. 2 illustrates an embodiment of a parallel hybrid drive system.

A vehicle control system according to a first embodiment of the present invention will be described with reference to FIG. 1.

The vehicle control system of the present embodiment includes a first motive power (energy) source 100, a second motive power (energy) source 200, and a combiner 300 to which motive power (energy) from the first and second motive power (energy) sources 100 and 200 is input. The combiner 300 mixes the motive power (energy) from the motive power (energy) sources 100 and 200 and transmits the motive power (energy) to a driving wheel 400.

The combiner 300 is controlled by an electronic control unit ECU 10-3 which is a first control unit. The first motive power (energy) source 100 is controlled by an electronic control unit ECU 10-1 which is a second control unit. The second motive power (energy) source 100 is controlled by an electronic control unit ECU 10-2 which is a third control unit.

Further, an electronic control unit ECU 10-0, which is a fourth control unit controlling energy management of the entire hybrid drive system, controls a mixing ratio of the motive power (energy) from the motive power (energy) source 100 and the motive power (energy) from the motive power (energy) source 200 in the combiner 300.

In the present embodiment, the ECU 10-3 is set to fail-operational (be capable of continuing the operation when a failure occurs). Specifically, a redundant configuration of an ECU 10-3a and an ECU 10-3b is conceivable as illustrated in the drawing. Then, the ECU 10-1 and the ECU 10-2 are configured to take a common cause failure measure such that both control functions are not lost due to the same failure or failure cause. Specifically, it is conceivable that housings, wiring boards, and semiconductor chips of the ECU 10-1 and the ECU 10-2 are physically separated or electrically separated by being operated by different power sources.

Further, when one motive power (energy) source (for example, 100) or control unit (for example, ECU 10-1) of the motive power (energy) source fails, the ECU 10-0 performs control such that the combiner 300 transmits energy to the driving wheel by motive power (energy) from the other motive power (energy) source (for example, 200) in the present embodiment. With the above control, the different motive power (energy) sources 100 and 200 can be regarded as redundant motive power (energy) sources, and thus, even if one fails, the other can continue the operation.

The present embodiment focuses on the redundancy inherent in the hybrid drive system, and has a system configuration in which different motive power sources can be regarded as redundant motive power by providing the control unit 10-0 which takes the common cause failure measure on the different motive power sources 100 and 200 and performs the energy management when one of the power sources fails. Thus, the hybrid drive system can be made fail-operational with less redundancy. Therefore, the fail-operational can be realized at a lower cost as compared with a case where the entire system is made completely redundant according to the present embodiment.

Second Embodiment

A second embodiment of the present invention will be described with reference to FIGS. 2 to 6.

Figure 3:
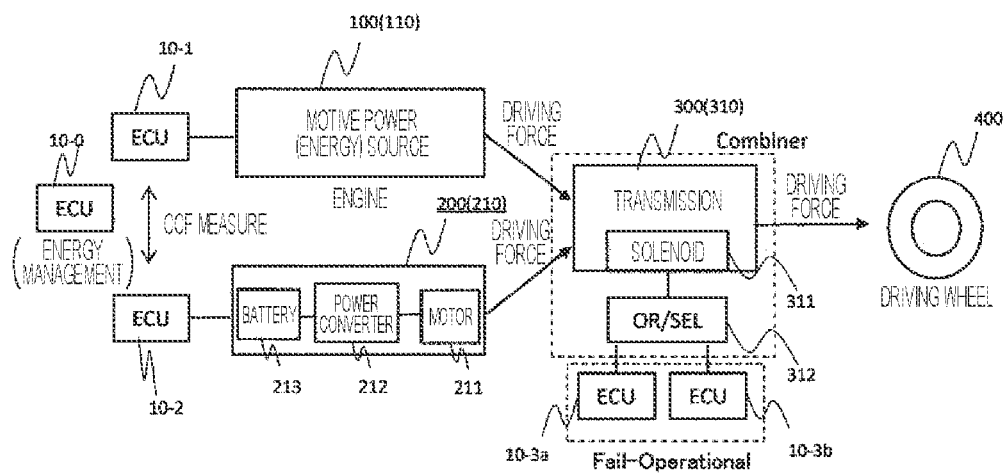
FIG. 3 illustrates the embodiment of the parallel hybrid drive system.

The present embodiment is an example in which the invention described in the first embodiment is applied to a parallel hybrid drive system. An engine 110 as the motive power (energy) source 100 in the embodiment of FIG. 1, a motive power (energy) source 210 including a motor as the motive power (energy) source 200, and a transmission 310 as the combiner 300 are provided. In the present embodiment, the motive power (energy) source 210 including the motor includes a motor (or a motor generator) 211, a power converter 212, and a battery 213. Driving forces from the engine 110 and the motor 211 are input to the transmission 310. In the transmission 310, the driving forces from the engine 110 and the motor 211 are mixed at an appropriate reduction ratio by a gear, a clutch, or the like. In many cases, an output shaft, connected to the engine 110, the motor 211, and a driving wheel, is coupled via the transmission, and the driving force from the engine 110, the motor 211, or both is transmitted to the output shaft by a clutch inserted therebetween. In the present embodiment, the ECU 10-3a and the ECU 10-3b that control the transmission 310 are redundantly provided. In a case where a solenoid 311 that drives a hydraulic valve of the transmission 310 is not redundantly provided but is a single system as illustrated in FIG. 3, the solenoid 311 is driven via an OR or a selector circuit 312 by a control signal from the redundant ECU 10-3a and ECU 10-3b.

Figure 4:
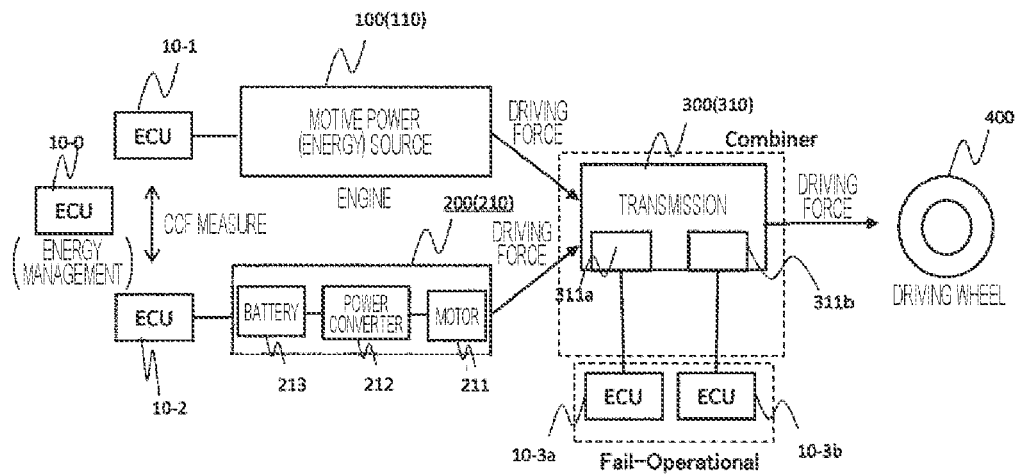
FIG. 4 illustrates the embodiment of the parallel hybrid drive system.

In a case where solenoids 311a and 311b are redundantly provided as illustrated in FIG. 4, the redundant ECU 10-3a and ECU 10-3b can drive the solenoids 311a and 311b, respectively. Note that the OR or the selector circuit can be also configured by a hydraulic circuit (not illustrated) inside the transmission 310.

Note that it is desirable that the power converter (inverter) 211 have not only a simple inverter function but also a four-quadrant conversion function capable of converting power generated by the output-side motor operating as a generator into DC power and returning the DC power to the battery 213 at the time of deceleration such that the motor (or motor generator) 211 perform not only driving but also regenerative braking.

Figure 5:
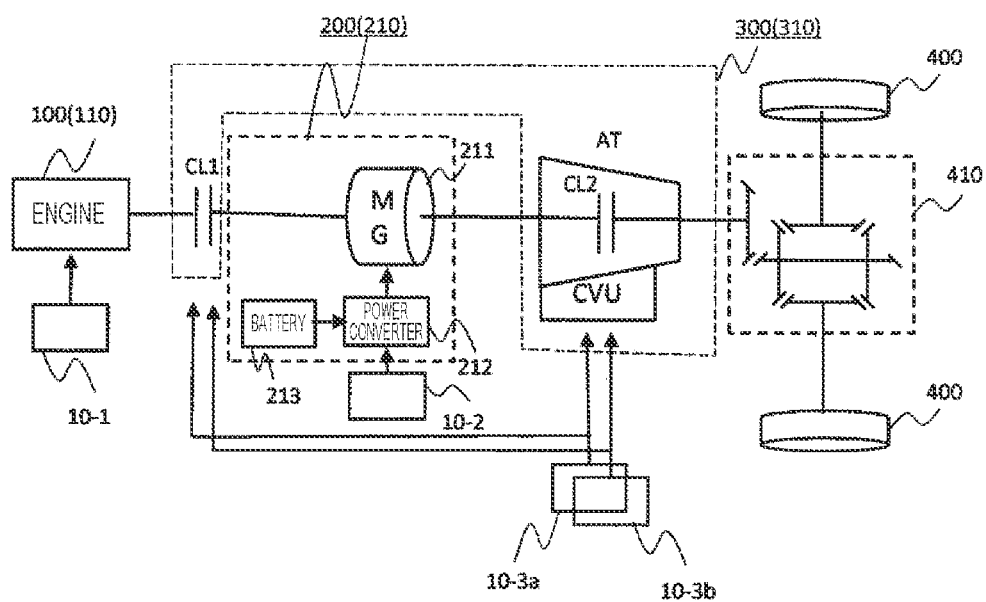
FIG. 5 illustrates a more detailed embodiment of the parallel hybrid drive system.

FIG. 5 is a more detailed embodiment of the parallel hybrid drive system.

A driving force output of the engine 110 is input to an automatic transmission AT via a clutch CL1 and the motor (or motor generator) 211. The automatic transmission AT includes a clutch CL2 and is controlled by a control valve unit CVU. It is desirable that a driving force from the automatic transmission AT be supplied to the driving wheel 400 and pass through a speed difference (rotational speed difference) differential gear 410 between the inner and outer wheels when a vehicle turns a curve.

The clutch CL1 is fastened to transmit the driving force of the engine 110 to the driving wheel 400 when the driving wheel 400 is driven by the engine 110, and is disconnected such that the engine 110 does not become a load of the motor (or motor generator) 211 when the driving wheel 400 is driven by the motor (or motor generator) 211. The clutch CL2 generates power by the driving force motor (or motor generator) 211 of the engine 110 at the time of stopping the vehicle when an SoC of the battery 213 deteriorates. As the clutch CL2, an example is illustrated in which one of friction fastening elements built in the automatic transmission AT is used. An example in which the independent clutch CL2 is arranged between a motor generator MG and the automatic transmission AT and an example in which the independent clutch CL2 is arranged between the automatic transmission AT and the driving wheel 400 are also conceivable.

Figure 6:
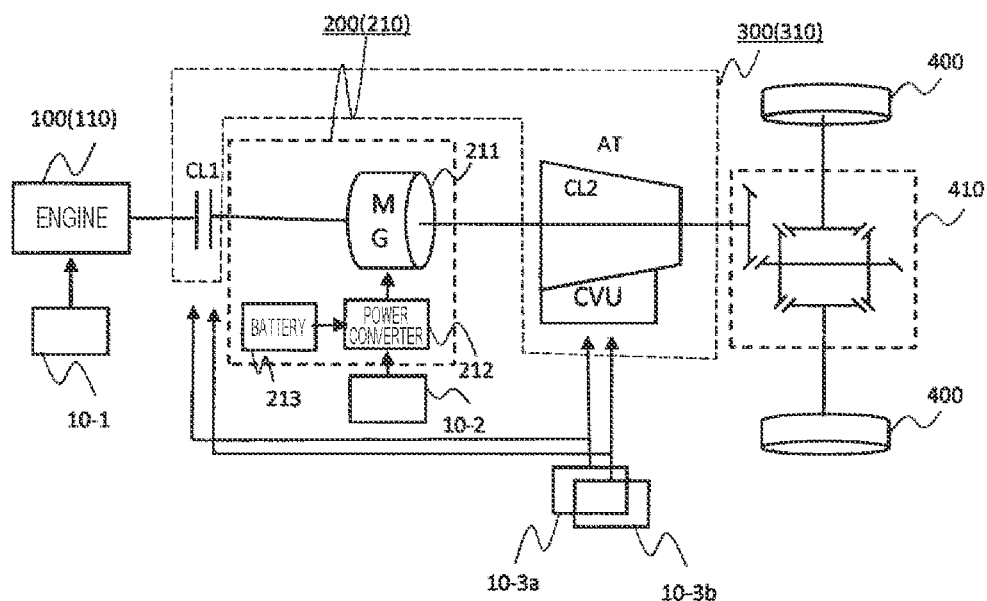
FIG. 6 illustrates a more detailed embodiment of the parallel hybrid drive system.

In addition, the clutch CL2 can be also omitted as illustrated in FIG. 6 unless the operation of generating power by the driving force motor (or motor generator) 211 of the engine 110 is performed at the time of stopping the vehicle.

In the present embodiment, the automatic transmission AT and the clutch CL1 (the clutch CL2 in the embodiment of FIG. 5) correspond to the combiner 300, and thus, these elements are controlled by the redundant ECUs 10-3a and 10-3b.

Third Embodiment

Figure 7:
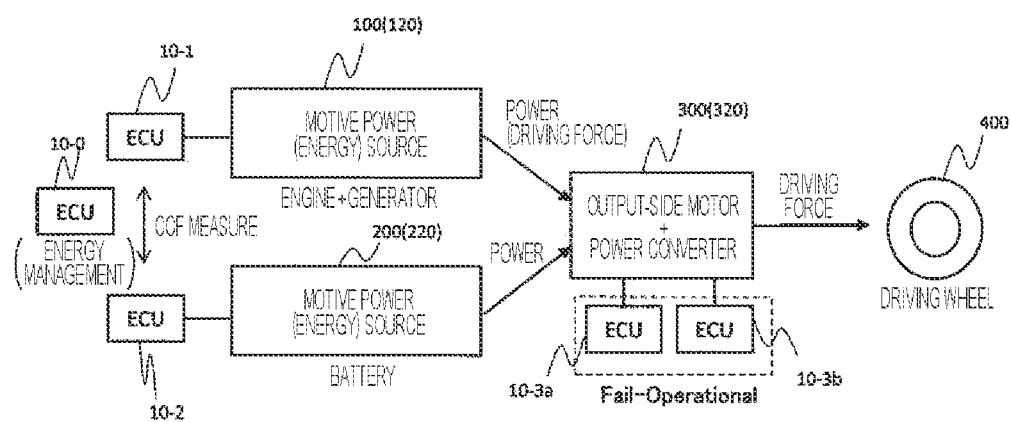
FIG. 7 illustrates an embodiment of a series hybrid drive system and a series-parallel hybrid drive system.

FIG. 7 is an embodiment in which the present invention is applied to a series hybrid drive system or a series-parallel hybrid drive system. An engine-generator 120 as the motive power (energy) source 100 in the embodiment of FIG. 1, a battery 220 as the motive power (energy) source 200, and an output-side motor (+power converter (inverter)) 320 as the combiner 300 are provided. The engine-generator 120 includes an engine 121, a generator 122, and a power converter 123, and the output-side motor (+power converter (inverter)) 320 includes an output-side motor (or motor generator) 321 and a power converter (inverter) 322.

Figure 8:
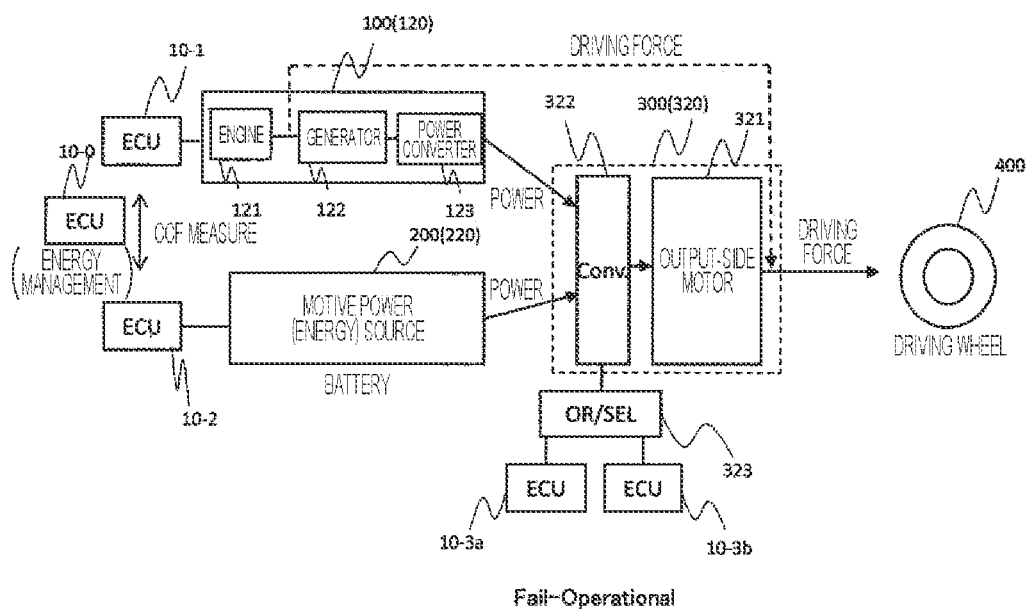
FIG. 8 illustrates the embodiment of the series hybrid drive system and the series-parallel hybrid drive system.
Figure 9:
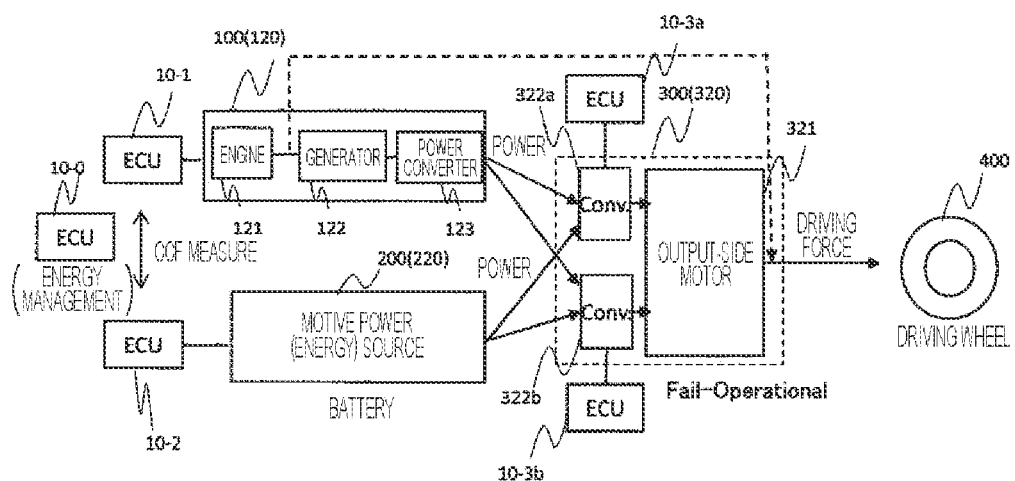
FIG. 9 illustrates the embodiment of the series hybrid drive system and the series-parallel hybrid drive system.

In an inner series hybrid drive system of the present embodiment, power (direct current) from the engine-generator 120 and the battery 220 is input to the power converter (inverter) 322, the power converter (inverter) 322 outputs a three-phase alternating current synchronized with one magnetic pole of the output-side motor 321 to drive the output-side motor 321, and the output-side motor 321 drives the driving wheel 400 as illustrated in FIGS. 8 and 9.

In the series-parallel hybrid drive system, not only the power from the engine-generator 120 but also a driving force from the engine 121 is also input to the output-side motor 321. Specifically, a rotary shaft of the engine 121 is connected to a rotary shaft of the output-side motor 321, and a driving force generated by the output-side motor 321 and the driving force generated by the engine 121 are combined to drive the driving wheel 400.

Note that it is desirable that the power converter (inverter) 322 have not only a simple inverter function but also a four-quadrant conversion function of converting power generated by the output-side motor (or motor generator) 321 operating as a generator into DC power and returning the DC power to the battery 220 at the time of deceleration such that the output-side motor 321 perform not only driving but also regenerative braking.

In the present embodiment, the ECU 10-3a and the ECU 10-3b that control the output-side motor (+power converter (inverter)) 320 are redundantly provided. In a case where the power converter (inverter) 322 that drives the output-side motor 321 is not redundantly provided but is a single system as illustrated in FIG. 8, the power converter (inverter) 322 is driven via an OR or a selector circuit 323 by a control signal from the redundant ECU 10-3a and ECU 10-3b. In addition, in a case where power converters (inverters) 322a and 322b are redundantly provided as illustrated in FIG. 9, the redundant ECU 10-3a and ECU 10-3b drive the power converters (inverters) 322a and 322b, respectively. Note that windings inside the output-side motor 321 (not illustrated) can also be made redundant.

Note that there is a case where power from the engine-generator 120 and the battery 220 is supplied to the power converter (inverter) 321 or the power converters (inverters) 322a and 322b via a diode OR (not illustrated), and a case where the engine-generator 120, the battery 220, and the power converters (inverters) 322a and 322b are connected to a common bus. In the former case, there is also a method of fixing the power of the engine-generator 120 to the power converter (inverter) 322a and the power from the battery 220 to the power converter (inverter) 322b and a combination of the motive power (energy) source and the power converter (inverter) in the embodiment (FIG. 9) having the plurality of power converters (inverters) 322a and 322b. In the latter case, an SoC of the battery 220 is controlled by an output voltage of the engine-generator 120 and output voltages of the power converters (inverters) 322a and 322b during regeneration, and thus, the ECU 10-2 estimates the SoC of the battery 220, and the ECU 10-0 outputs a command value for the output voltage of the engine-generator 120 to the ECU 10-1 and the output voltages of the power converters (inverters) 322a and 322b during regeneration to the ECUs 10-3*a* and 10-3*b*. In addition to the above, the ECU 10-2 protects the battery 220 by opening a contact (switch) connecting the battery 220 and the bus when the SoC of the battery 220 is abnormal.

Figure 10:
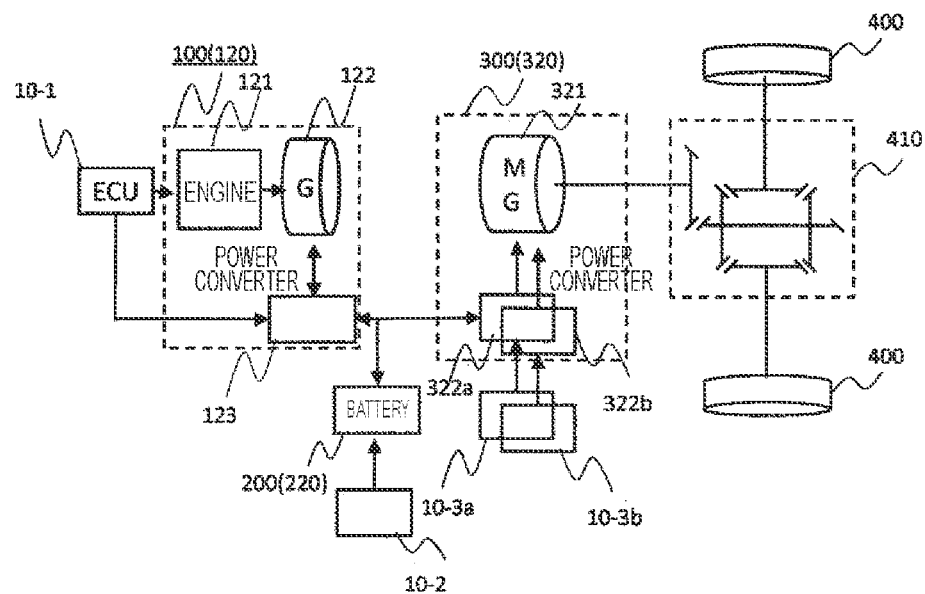
FIG. 10 illustrates a more detailed embodiment of the series hybrid drive system.

FIG. 10 is a more detailed embodiment in which the present invention is applied to a series hybrid drive system (including a range extender). A drive output shaft of the engine 121 is mechanically connected to the generator 122, and a power terminal of the generator 122 is connected to the battery 220 and the power converters (inverters) 322*a* and 322*b* via the power converter 123. The power converters (inverters) 322*a* and 322*b* convert power (direct current) from the power converter 123 and the battery 220 into three-phase alternating current power to drive the output-side motor (or motor generator) 321.

Figure 11:
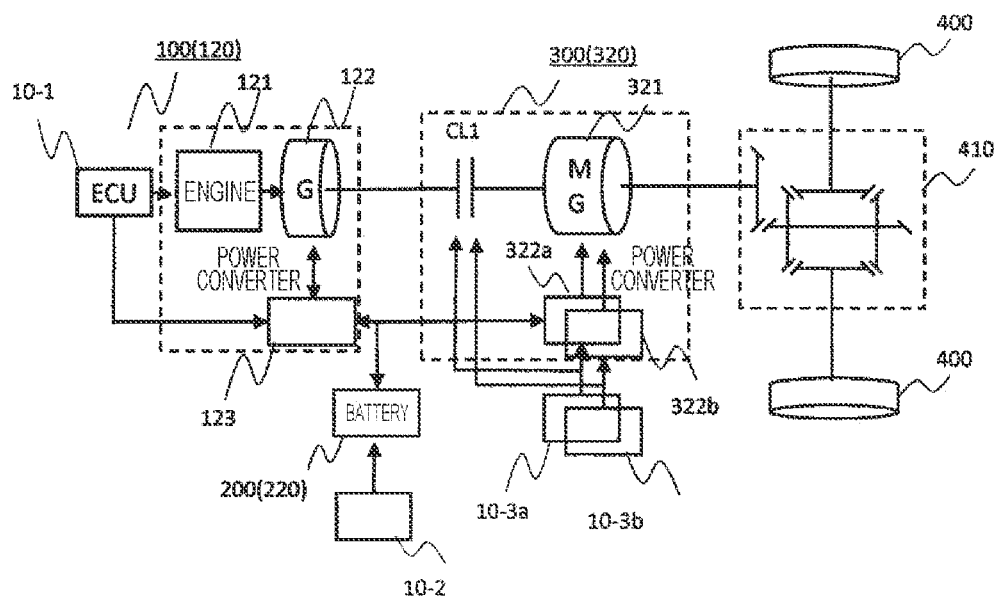
FIG. 11 illustrates a more detailed embodiment of the series hybrid drive system.

Note that, when the drive output of the engine is directly transmitted to the driving wheel 400 when a load is high by mechanically connecting the drive output shaft, which mechanically connects the engine 121 and the generator 122, to a drive output shaft of the output-side motor (or motor generator) 321 via the clutch CL1 as illustrated in FIG. 11, it is also possible to eliminate a conversion loss caused by converting into power with the generator 122, the power converter 123, the power converters (inverters) 322*a* and 322*b*, and the output-side motor (or motor generator) 321.

In the present embodiment, the output-side motor (or motor generator) 321, the power converters (inverters) 322*a* and 322*b*, and (the clutch CL1 in the embodiment of FIG. 11) correspond to the combiner 300, and thus, these elements are controlled by the redundant ECUs 10-3*a* and 10-3*b*.

Figure 12:
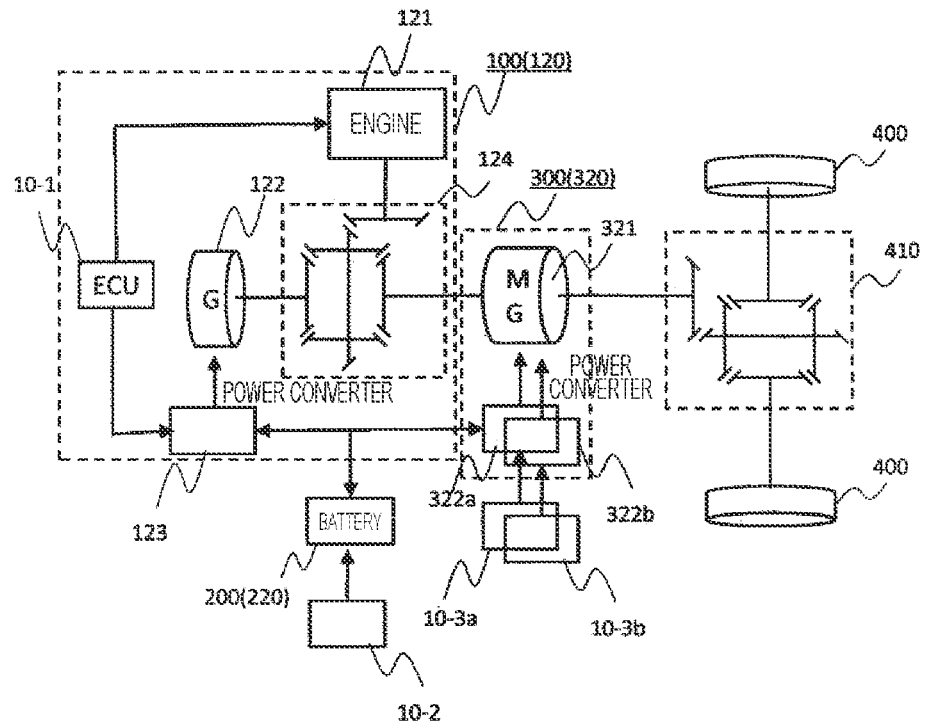
FIG. 12 illustrates a more detailed embodiment of the series-parallel hybrid drive system.

FIG. 12 is a more detailed embodiment in which the present invention is applied to a series-parallel hybrid drive system. The drive output of the engine 121 is mechanically transmitted to the generator 122 and the combiner 300 via a motive power distribution mechanism 124. The output of the generator 122 is electrically transmitted to the battery 220 and the power converters 322*a* and 322*b* in the combiner 300 (320) via the power converter 123.

In the combiner 300 (320), the drive output of the engine 121 transmitted via the motive power distribution mechanism 124 is mechanically connected to the output shaft of the output-side motor (or motor generator) 321, and the output-side motor (or motor generator) 321 drives the driving wheel 400. Further, the power converters 322*a* and 322*b* convert power (direct current) supplied from the power converter 123 and the battery 220 into three-phase alternating current to drive the output-side motor (or motor generator) 321.

Figure 13:
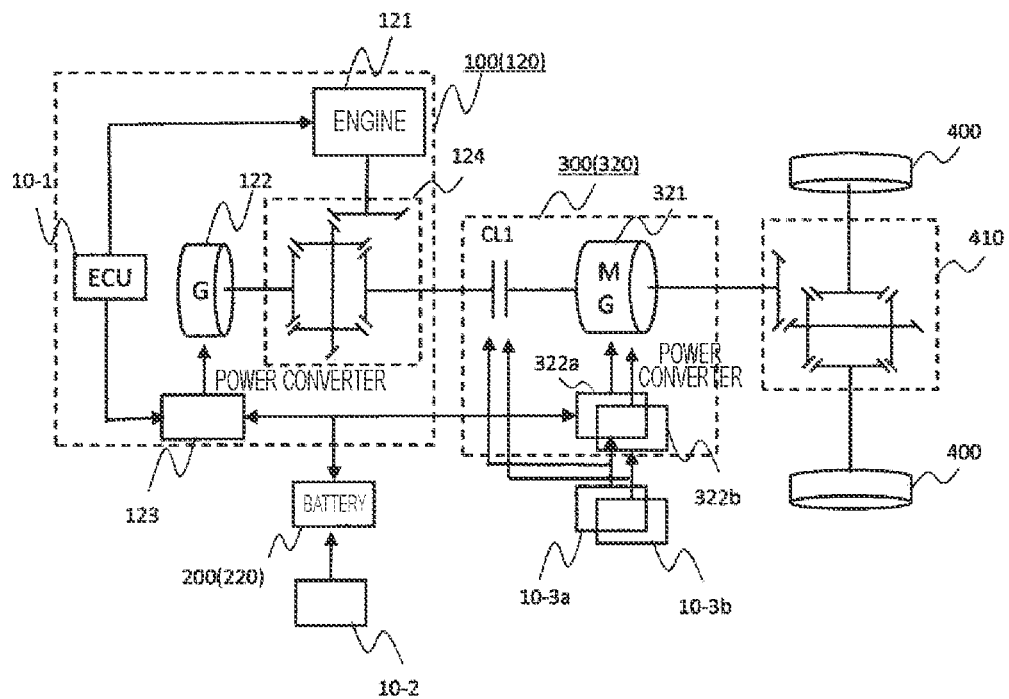
FIG. 13 illustrates a more detailed embodiment of the series-parallel hybrid drive system.

In addition, when the motive power distribution mechanism 124 and the output shaft of the output-side motor (or motor generator) 321 are mechanically connected via the clutch CL1 as illustrated in FIG. 13, it is possible to prevent the engine 121 from becoming a load and reduce the loss by disconnecting the engine 121 using the clutch CL1 during cruise at a high speed with a light load.

Note that there are various implementation methods for the motive power distribution mechanism 124. For example, there are a method of using a differential gear in the motive power distribution mechanism 124, a method of using a planetary gear disclosed in JP H9-100853, and a method of using a motor including a plurality of rotors disclosed in WO 2008/018539.

In the present embodiment, the output-side motor (or motor generator) 321, the power converters (inverters) 322*a* and 322*b*, and (the clutch CL1 in the embodiment of FIG. 13) correspond to the combiner 300, and thus, these elements are controlled by the redundant ECUs 10-3*a* and 10-3*b*.

The operation of the entire drive system can be continued even when a failure occurs only by making the ECU that controls a portion corresponding to the combiner 300 redundant with the ECUs 10-3*a* and 10-3*b* as described above in the parallel hybrid drive system, the series hybrid drive system, and the series-parallel hybrid drive system according to the present invention.

Fourth Embodiment

Figure 14:
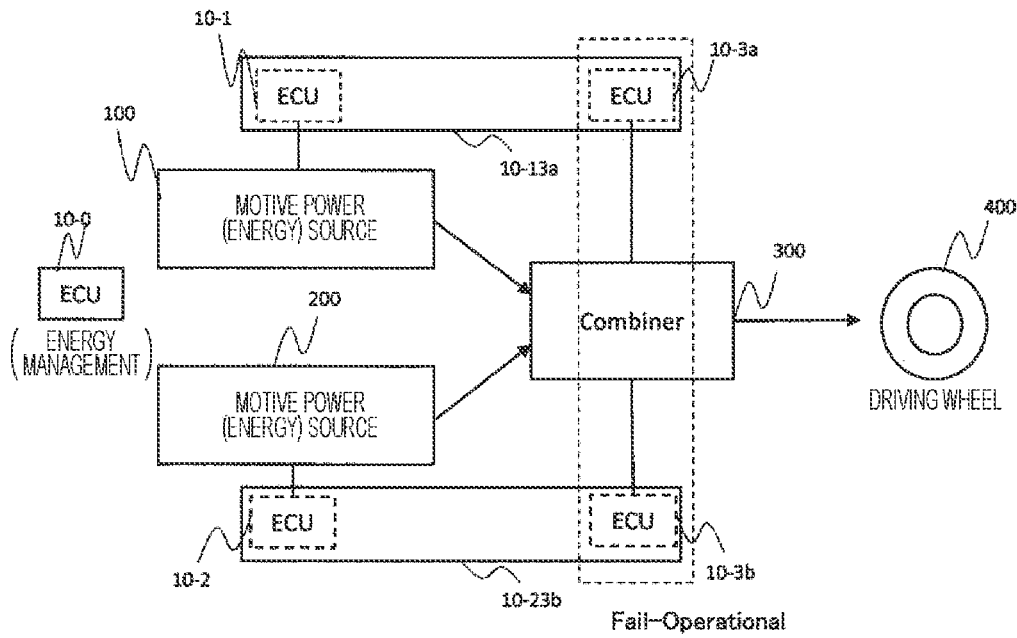
FIG. 14 illustrates an embodiment in which ECUs are integrated.

FIG. 14 illustrates an embodiment in which ECUs are integrated, which is the embodiment in which the ECU 10-1 and the ECU 10-3*a*, and the ECU 10-2 and the ECU 10-3*b* are configured using a common housing, wiring board, semiconductor chip, or the like. In other words, a first control device (ECU 10-13*a*) includes the first control unit (ECU 10-3*a*) and the second control unit (ECU 10-1), and a second control device (ECU 10-23*b*) includes the first control unit (ECU 10-3*b*) and the third control unit (ECU 10-2). According to the present embodiment, the second control unit ECU 10-1 and the third control unit ECU 10-2 are configured using separate housings, wiring boards, semiconductor chips, or the like, and thus, it is possible to reduce the occurrence of a failure due to a common cause therebetween. Further, the first control units (ECU 10-3*a* and ECU 10-3*b*) having a redundant configuration are also configured using separate housings, wiring boards, chips, or the like, and thus, it is possible to reduce the occurrence of a failure due to a common cause therebetween, and it is possible to enhance the effect of redundancy.

Fifth Embodiment

Figure 15:
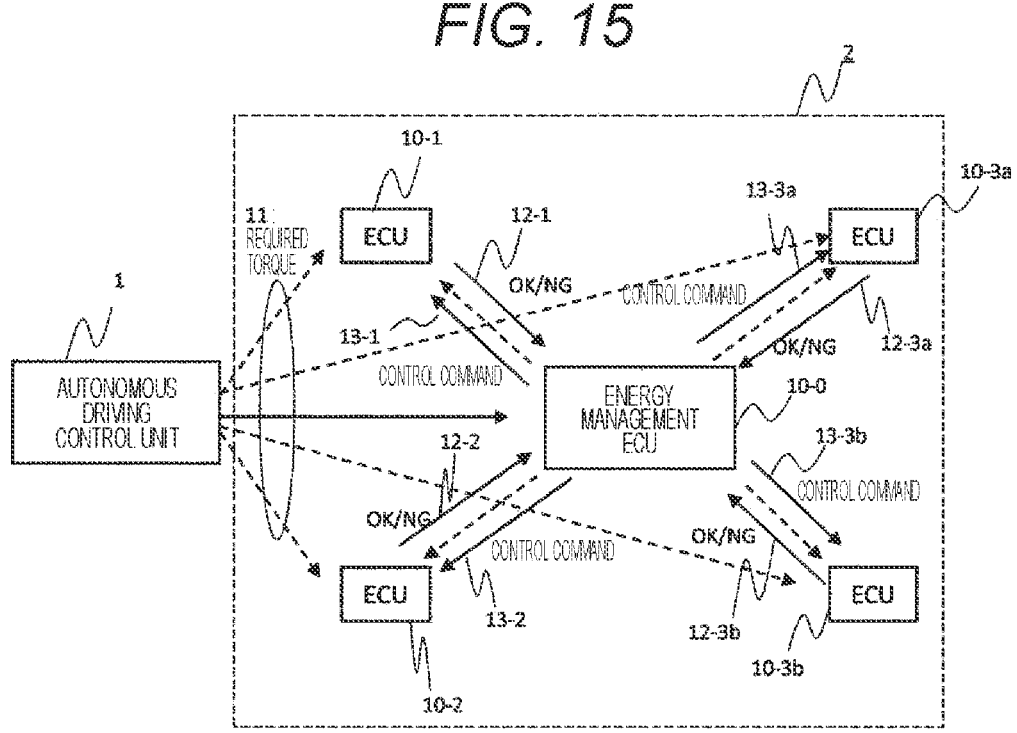
FIG. 15 illustrates an embodiment of a signal flow between ECUs.

FIG. 15 illustrates a signal flow between ECUs. The energy management ECU 10-0 outputs control commands 13-1, 13-2, 13-3*a*, and 13-3*b* to the respective ECUs 10-1, 10-2, 10-3*a*, and 10-3*b* based on a required torque 11 from an autonomous driving control unit 1.

A feature of the present invention is that the energy management ECU 10-0 outputs the control commands 13-1, 13-2, 13-3*a*, and 13-3*b* based on diagnosis results (OK/NG) 12-1, 12-2, 12-3*a*, and 12-3*b* from the respective ECUs 10-1, 10-2, 10-3*a*, and 10-3*b*. That is, when one motive power (energy) source (for example, 100) or control unit (for example, ECU 10-1) of the motive power (energy) source fails (for example, when the diagnosis result 12-1 is NG), the ECU 10-0 performs control such that the combiner 300 transmits energy to the driving wheel by motive power (energy) from the other motive power (energy) source (for example, 200).

The ECUs 10-1, 10-2, 10-3*a*, and 10-3*b* have diagnosis functions, and determine whether the ECUs 10-1, 10-2, 10-3*a*, and 10-3*b* are normal or abnormal and whether the motive power (energy) sources 100 and 200 and the combiner 300, which are control targets, are normal or abnormal by the diagnosis functions, and send the diagnosis results (OK/NG) 12-1, 12-2, 12-3*a*, and 12-3*b* to the energy management ECU 10-0.

In addition, when the energy management ECU 10-0 fails, a diagnosis result (OK/NG) 12-0 of the energy management ECU is sent to each of the ECUs 10-1, 10-2, 10-3*a*, and 10-3*b*, and each of the ECUs 10-1, 10-2, 10-3*a*, and 10-3*b* operates as in the embodiments illustrated in FIGS. 17 to 26 based on the required torque 11 from the autonomous driving control unit 1.

Next, an operation in each case is illustrated in FIG. 16.

In Case 0 where all the diagnosis results 12-1, 12-2, 12-3a, and 12-3b are OK, the ECUs 10-1 and 10-2 are caused to optimally control the motive power (energy) sources 100 and 200, respectively, by energy management, and the ECU 10-3a and the ECU 10-3b are caused to perform control to operate the combiner 300 by the outputs of the motive power (energy) sources 100 and 200.

In Case 1 where only the diagnosis result 12-1 is NG and the others are OK, the ECU 10-1 is uncontrollable so that the operation of the motive power (energy) source 100 is stopped, and the ECU 10-2 is caused to control the motive power (energy) source 200 by the required torque 11. Further, the ECU 10-3a and the ECU 10-3b are controlled to operate the combiner 300 by the output of the motive power (energy) source 200.

In Case 4 where the diagnosis results 12-1 and 2 are NG, the ECUs 10-1 and 2 are uncontrollable so that the operations of the motive power (energy) sources 100 and 200 are stopped, and the ECU 10-3a and the ECU 10-3b are caused to stop the operation of the combiner 300.

In Case 5 where only the diagnosis result 12-3a is NG and the others are OK, the ECUs 10-1 and 10-2 are caused to optimally control the motive power (energy) sources 100 and 200, respectively, by energy management, and the ECU 10-3b is caused to perform control to operate the combiner 300 by the outputs of the motive power (energy) sources 100 and 200.

Figure 17:
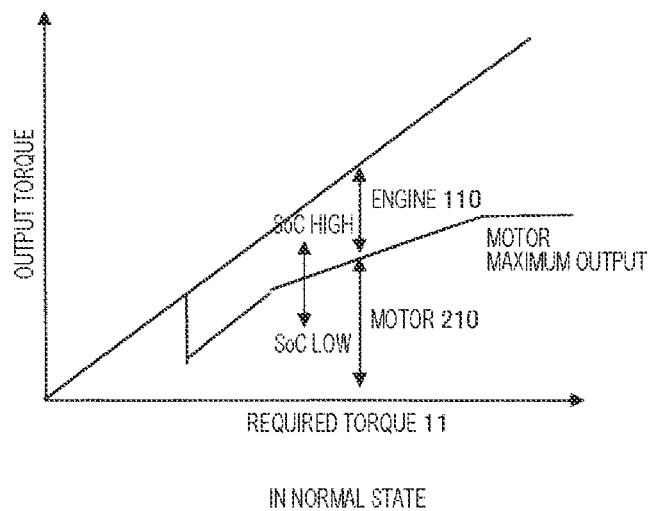
FIG. 17 illustrates an embodiment of an operation of the parallel hybrid drive system.
Figure 18:
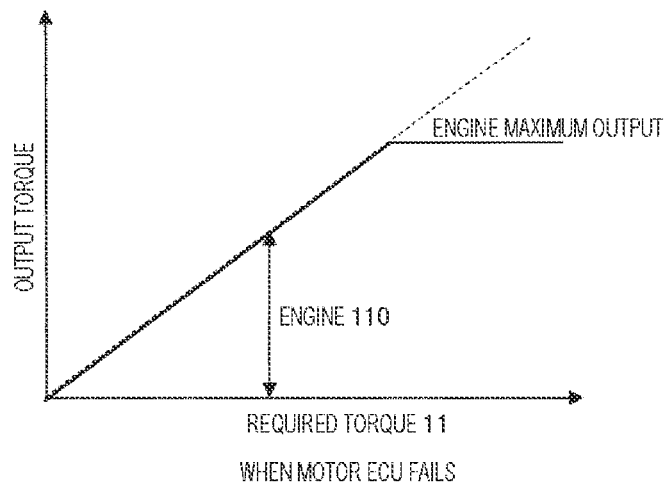
FIG. 18 illustrates the embodiment of the operation of the parallel hybrid drive system.
Figure 19:
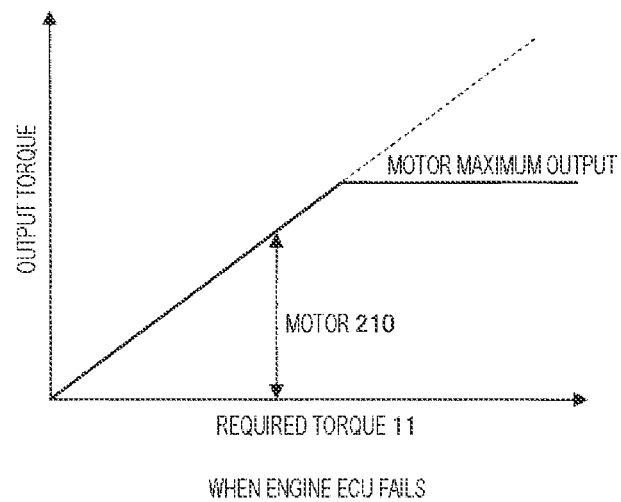
FIG. 19 illustrates the embodiment of the operation of the parallel hybrid drive system.

FIGS. 17 to 19 illustrate an embodiment of the operation of the parallel hybrid drive system. In a normal state, control is performed such that output torques of the engine 110 and the motor 210 are optimally distributed in response to the required torque 11 in consideration of the SoC of the battery 213 or the like, and the output torque is output from the combiner 300 as illustrated in FIG. 17.

When the motor 210 or the ECU 10-2 fails, the engine 110 performs control to output the output torque from the combiner 300 in response to the required torque 11 as illustrated in FIG. 18. In this case, the regenerative braking by the motor 210 is impossible, and thus, a braking torque is generated by a mechanical brake or an engine brake using the engine 110 at the time of braking. Note that the braking by the mechanical brake with simple control is desirable for safety.

Subsequently, when the engine 110 or the ECU 10-1 fails, the motor 210 performs control to output the output torque from the combiner 300 in response to the required torque 11 as illustrated in FIG. 19.

In this case, the regenerative braking by the motor 210 is possible, and thus, the regenerative braking by the motor 210 and the mechanical brake are cooperatively operated at the time of braking to generate the braking torque. Note that the braking by the mechanical brake with simple control is desirable for safety.

In addition, when the ECU 10-0 fails, the ECU 10-1, the ECU 10-2, the ECU 10-3a, and the ECU 10-3b may perform determination based on the required torque instructed by the autonomous driving control unit 1 in an autonomous driving car or by an accelerator pedal opening degree of a driver in a conventional manually-driven car, respectively, to perform the operation fixed to either one of FIG. 18 or 19.

Figure 20:
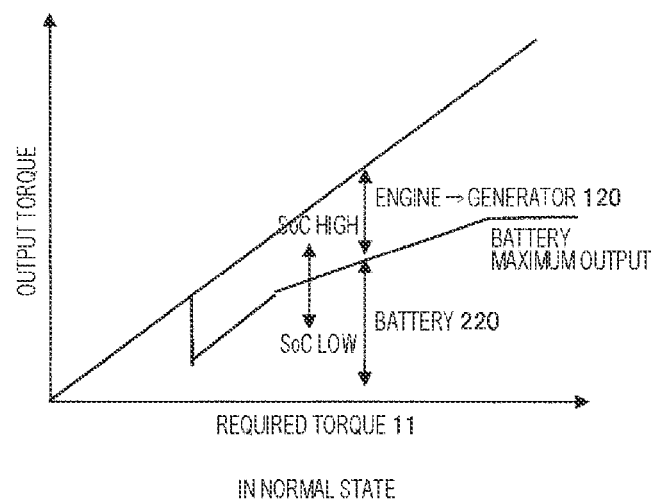
FIG. 20 illustrates an embodiment of an operation of the series hybrid drive system.
Figure 21:
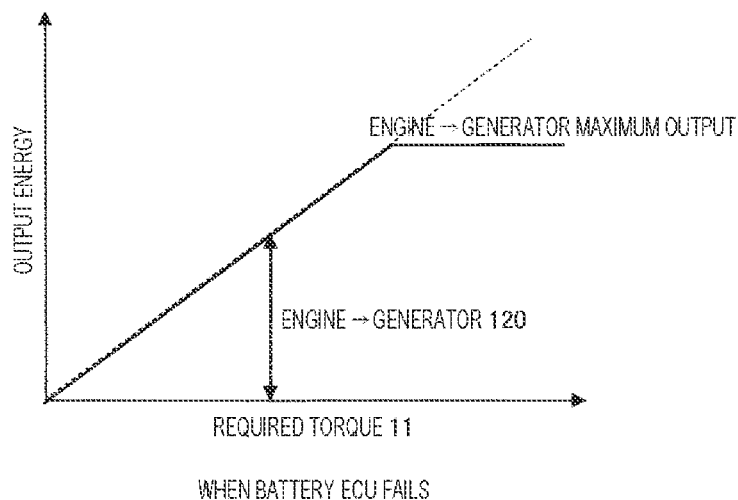
FIG. 21 illustrates the embodiment of the operation of the series hybrid drive system.
Figure 22:
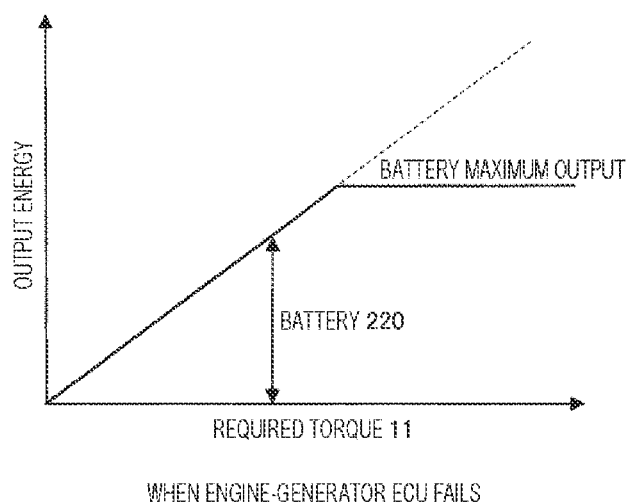
FIG. 22 illustrates the embodiment of the operation of the series hybrid drive system.

FIGS. 20 to 22 illustrates an embodiment of the operations of the series hybrid drive system and the series-parallel hybrid drive system. In a normal state, control is performed such that power energy from the engine-generator 120 and the battery 220 is optimally distributed in response to the required torque 11 in consideration of the SoC of the battery 220 or the like, and the output energy (torque) is output from the combiner 300 as illustrated in FIG. 20.

When the battery 220 or the ECU 10-2 fails, control is performed to output the output energy (torque) from the combiner 300 by the power energy from the engine-generator 120 in response to the required torque 11 as illustrated in FIG. 21. In this case, it is difficult for the battery 220 to absorb regenerative power, and thus, the energy is absorbed by a mechanical brake or an engine brake using the engine 121 at the time of braking. In order to absorb the energy by the engine brake, a method of rotating the engine 121 by fastening the clutch CL1 or a method of rotating the engine 121 by operating the generator 122 as a motor via the power converter 123 with regenerative power from the motor 321 are conceivable. Note that the braking by the mechanical brake with simple control is desirable for safety.

When the engine-generator 120 or the ECU 10-1 fails, control is performed to output the output energy (torque) from the combiner 300 by the power energy from the battery 220 in response to the required torque 11 as illustrated in FIG. 22. In this case, the regenerative power can be absorbed by the battery 220, and thus, the regenerative braking by the motor 321 and the mechanical brake are cooperatively operated at the time of braking to generate a braking torque. Note that the braking by the mechanical brake with simple control is desirable for safety.

In addition, when the ECU 10-0 fails, the ECU 10-1, the ECU 10-2, the ECU 10-3a, and the ECU 10-3b may perform determination based on the required torque instructed by the autonomous driving control unit 1 in an autonomous driving car or by an accelerator pedal opening degree of a driver in a conventional manually-driven car, respectively, to perform the operation fixed to either one of FIG. 21 or 22.

Figure 23:
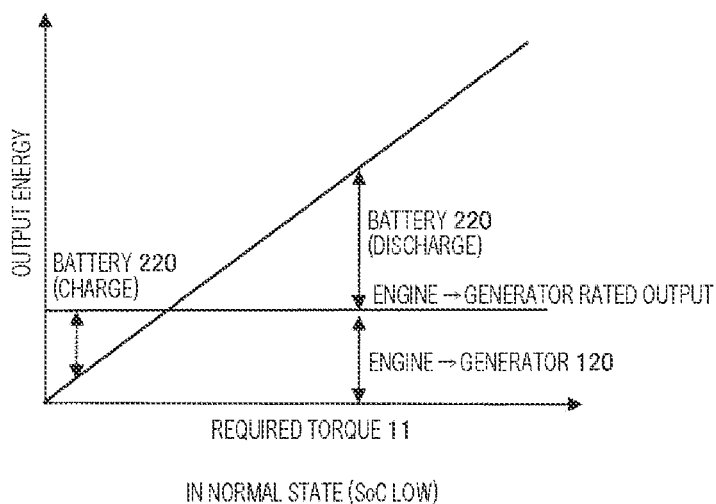
FIG. 23 illustrates an embodiment of an operation of a range extender.
Figure 24:
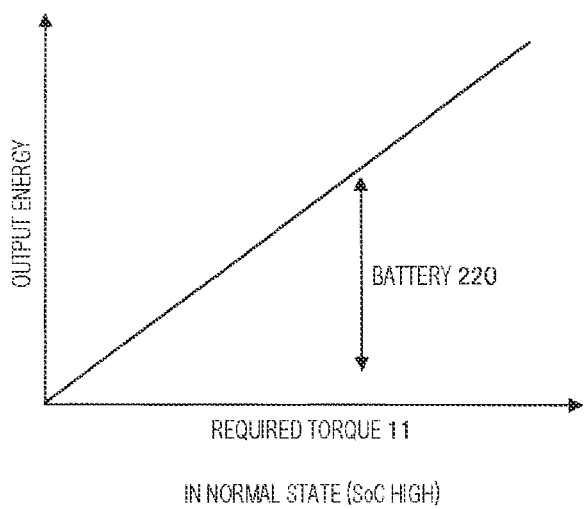
FIG. 24 illustrates the embodiment of the operation of the range extender.

FIGS. 23 to 26 correspond to an embodiment of an operation of a range extender. Power is generated by the engine-generator 120 as illustrated in FIG. 23 when the SoC of the battery 220 is low in a normal state, but control is performed to output the output energy (torque) from the combiner 300 by the power energy from the battery 220 as illustrated in FIG. 24 when the SoC is high.

Figure 25:
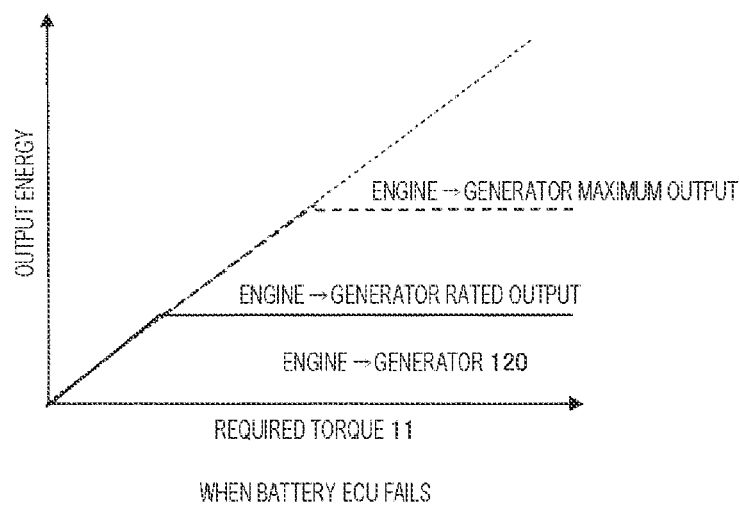
FIG. 25 illustrates the embodiment of the operation of the range extender.

When the battery 220 or the ECU 10-2 fails, control is performed to output the output energy (torque) from the combiner 300 by the power energy from the engine-generator 120 in response to the required torque 11 as illustrated in FIG. 25. In this case, it is difficult for the battery 220 to absorb regenerative power, and thus, the energy is absorbed by a mechanical brake or an engine brake using the engine 121 at the time of braking. Note that the braking by the mechanical brake with simple control is desirable for safety.

Figure 26:
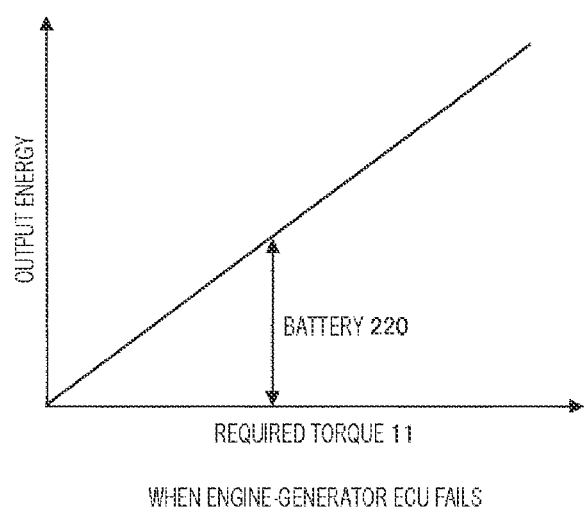
FIG. 26 illustrates the embodiment of the operation of the range extender.

When the engine-generator 120 or the ECU 10-1 fails, control is performed to output the output energy (torque) from the combiner 300 by the power energy from the battery 220 in response to the required torque 11 as illustrated in FIG. 26. In this case, the regenerative power can be absorbed by the battery 220, and thus, the regenerative braking by the motor 321 and the mechanical brake are cooperatively operated at the time of braking to generate a braking torque. Note that the braking by the mechanical brake with simple control is desirable for safety.

In addition, when the ECU 10-0 fails, the ECU 10-1, the ECU 10-2, the ECU 10-3a, and the ECU 10-3b may perform determination based on the required torque instructed by the autonomous driving control unit 1 in an autonomous driving car or by an accelerator pedal opening degree of a driver in a conventional manually-driven car, respectively, to perform the operation fixed to either one of FIG. 25 or 26.

REFERENCE SIGNS LIST 100, 200 motive power (energy) source
300 combiner
400 driving wheel
10 electronic control unit ECU

The invention claimed is:

1. A vehicle control system comprising:
  a transmission unit that transmits energy to a driving wheel;
  a first control unit that controls the transmission unit;
  a first source that inputs energy to the transmission unit;
  a second source that inputs energy to the transmission unit;
  a second control unit that controls the first source; and
  a third control unit that controls the second source, wherein
    the first control unit has a function of continuing an operation when a failure occurs,
    the second control unit and the third control unit have a common cause failure measure, and
    the function mixes energy from different sources and transmits energy to the driving wheel.

2. The vehicle control system according to claim 1, further comprising
  a fourth control unit that controls the input of the energy from the first source and the second source to the transmission unit,
  wherein the fourth control unit performs control to input only the energy from the second source to the transmission unit when the first source or the second control unit fails, and performs control to input only the energy from the first source to the transmission unit when the second source or the third control unit fails.

3. The vehicle control system according to claim 1, wherein
  the first control unit having the function of continuing the operation when the failure occurs has a redundant configuration.

4. The vehicle control system according to claim 1, wherein
  the common cause failure measure is at least one of that the second control unit and the third control unit are configured using microprocessors of different semiconductor chips, that the second control unit and the third control unit are configured using different wiring boards, and that the second control unit and the third control unit are configured using different housings.

5. The vehicle control system according to claim 1, wherein
  the transmission unit is a motor, the first source includes an engine and a generator, and the second source is a series hybrid which is a battery.

6. The vehicle control system according to claim 1, wherein
  the transmission unit is a transmission, the first source is an engine, and the second source is a parallel hybrid including a battery and a motor.

7. The vehicle control system according to claim 1, wherein
  the transmission unit is a motor, the first source includes an engine and a generator, and the second source is a series-parallel hybrid which is a battery.

8. The vehicle control system according to claim 1, further comprising:
  a first control device including the first control unit and the second control unit; and
  a second control device including the first control unit and the third control unit.

9. A vehicle control device mounted on a vehicle comprising:
  a transmission unit that transmits energy to a driving wheel;
  a first control unit that controls the transmission unit;
  a first source that inputs energy to the transmission unit;
  a second source that inputs energy to the transmission unit;
  a second control unit that controls the first source; and
  a third control unit that controls the second source, the vehicle control device
  performing control to input only the energy from the second source to the transmission unit when the first source or the second control unit fails, and
  performing control to input only the energy from the first source to the transmission unit when the second source or the third control unit fails.

* * * * *